Patented Dec. 26, 1939

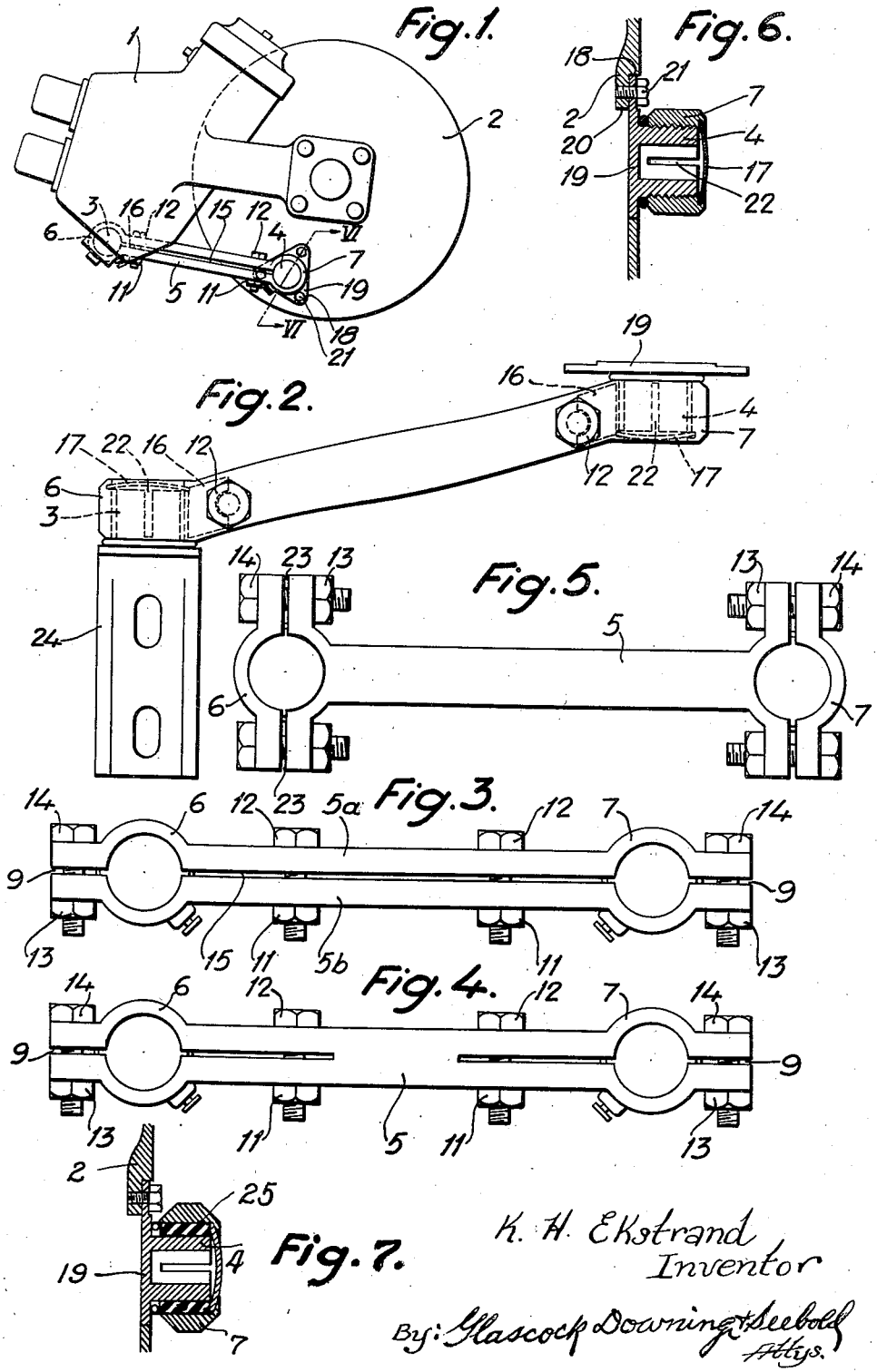

2,184,587

UNITED STATES PATENT OFFICE 2,184,587

SUPPORTING ARM DEVICE

Karl Helmer Ekstrand, Skarplinge, Sweden

Application May 3, 1938, Serial No. 205,861
In Sweden May 3, 1937

4 Claims. (Cl. 267—66)

The heretofore existing toggle joint springing means for automobiles, provided with a supporting arm extending between a brake frame and the casing enclosing the spring means, the end portions of the said supporting arm consisting of sleeves preferably provided with interior threads and surrounding fastening pins, have very considerable drawbacks. As a matter of fact, the said sleeves are worn out after having been used for a very short time, in which case the supporting arms and, most often, also the fastening pins, must be entirely replaced by new ones, since heretofore there has existed no possibility of adjusting the worn out sleeves and pins, respectively. In addition to the costs caused by the replacement of the said supporting arms there are also very expensive mounting costs, particularly on account of the difficulty of detaching the fastening pin of the brake frame without the removal of which it has not been possible, either, to detach the supporting arm.

The present invention makes it possible for the first time to eliminate the said drawbacks in a manner, which is very simple from a constructional point of view. Thus, it is possible in the device according to the invention, without circumstantial mounting work and expensive replacement of the supporting arm to adjust the sleeves several times, and also one of the fastening pins, as soon as signs of wear and tear appear. Not only this but the invention relays wear and tear by making the arm springing to some extent. Moreover, the further advantage is obtained that when, in spite of all, replacement of a supporting arm finally has to be done, such replacement may be effected without any expensive mounting costs.

Four embodiments of the invention are illustrated on the accompanying drawing, in which Figure 1 shows the supporting arm according to one embodiment when mounted in its position.

Figure 2 shows the same supporting arm separately, when viewed from above, and on a larger scale.

Figures 3, 4, and 5, show, also separately, the supporting arm according to the three remaining embodiments.

Figure 6 shows a section on the line VI—VI of Figure 1.

Figure 7 is a sectional detail of a further modification.

Referring to the drawing numeral 1 indicates the spring casing and 2 the brake frame. On each of the said parts there is provided a pin 3 and 4, respectively, which are surrounded by the sleeves 6, 7 formed from the supporting arm 5. In order to make it possible, without any special fastening means, to retain the arm on the pins 3 and 4 the latter are preferably provided with exterior threads to which respond interior threads in the sleeves 6, 7. According to the invention the sleeves are slotted either in the manner shown in Figures 1 and 2, or in Figures 3, 4, and 5. In the embodiment according to Figures 1 and 2 there is one single relatively broad slot 15, extending all the way through the arm and adapted to be pressed together by means of bolts 12 provided with nuts 11. Resilient packing means 16 prevent dirt and impurities from entering between the threads of the sleeves 6, 7 and those of the pins 3, 4. For the same purpose each sleeve 6, 7 is preferably provided with a cover 17, see Figure 6. Because of the fact that not only a tightening of the sleeves 6, 7 is aimed at but it is desired also, by changing the position of the fastening pin 4 of the brake frame, to be able to obtain a compensation of the relatively one-sided wear and tear, to which the said pin has been subject during the swinging of the supporting arm, the following provision is made:

In the brake frame there is provided a triangular opening 18, the sides of which are of equal length. In the said opening there is inserted a plate member 19 of a shape corresponding to that of the opening 18. The said plate member, which rests against projections 20 provided on the inside of the brake frame, is secured by means of bolts 21, screwed into the said projections, in the manner shown in Figure 6. By releasing the plate 19 from outside and turning the same it will thus be possible in the present case to subject the pin 4 to a wear and tear, which is three times the heretofore possible wear and tear. It is possible also to provide the pin, which in the shown embodiment is hollow, with a slot 22, in which it is possible, for example by introducing a conical or wedge-shaped member, to cause the pin to become wider. Thus, in this embodiment it is possible, on one hand by tightening the sleeve 7, on the other hand by turning the pin 4, and finally by making the pin 4 wider, to obtain a compensation for the wear and tear to which the pin and the sleeve, respectively, have been subject when the arm, during the springing of the automobile, has performed its limited swinging movement.

In the embodiment according to Figure 3 the arm is provided not only with a longitudinally extending slot 15 but also the end portions of the supporting arm are each provided with its slot 9, extending in the longitudinal direction of the arm and all the way through the arm. Thus, the arm will consist of two symmetrical halves 5ª, 5ᵇ, which are held together by means of bolts 12 provided with nuts 11. By tightening bolts 14, which are provided with nuts 13, it is possible to obtain desired friction between the threads of the pins 3, 4 and those of the sleeves 6, 7 and, after the arm having been fixed, the slots 15 and 9 then provide for suitable springing being obtained.

The arm according to Figure 4 is substantially the same as the arm according to Figure 3, although with the difference that the arm according to Figure 4 consists of one single piece. Otherwise, the slots 8, which extend only a short distance towards each other, and the slots 9 in the last mentioned arm, are provided in a plane extending approximately through the centre of the sleeves 6, 7, in the same manner as in the embodiments according to Figures 1, 2, and 3.

In the embodiment according to Figure 5 the slots indicated by 23 extend in a plane, which is about perpendicular to the longitudinal direction of the arm. Also here the sleeves are otherwise adopted to be tightened by means of bolts 14 provided with nuts 13.

It will be immediately understood that for detaching and applying the arm it is necessary only to screw off and, respectively, tighten the nuts 11 and 13. In the embodiment according to Figures 1 and 2 it is then, of course, presumed that the slot 15 be widened much enough when screwing off the nuts 11. As to the fastening pin 3 united with the spring casing 1 it is not at all difficult to replace the said pin, the same being shaped from a member 24 (Figure 2), which by means of bolts may, from outside, be screwed fast on the underside of the spring casing.

Several modifications may of course be devised within the scope of the invention. So, for example, the pins and the sleeves may be given the shape of ball and socket joints and further the sleeves may, on the inside, be provided with ball bearings or metallic or rubber bushings 25 (Fig. 7), without abandonment of the idea upon which the invention is based.

Having now described my invention, what I claim as new and desire to secure by Letters Patent is:

1. A device in toggle joint springing means for motor vehicles including in combination a brake casing having an aperture the sides of which are of equal length, a plate introduced into the aperture and of a shape corresponding to the shape of the aperture, means for detachably fastening the plate within the aperture, a supporting arm extending from said brake casing, a spring casing at the outer end of the arm, fastening pins at the lower end of the spring casing and on the plate on the brake casing, a link having sleeve-like terminals the link and its sleeve-like terminals being slotted for facilitating quick engagement of the terminals with the pins, and means associated with the slotted link for tightening the sleeve-like terminals about the fastening means.

2. A toggle joint springing means for vehicles including in combination a brake casing, an arm mounted on and extending from the brake casing, a spring casing at the outer end of the arm, a member removably mounted on the lower end of the spring casing and having its outer projecting end constructed in the form of an exteriorly threaded pin, another exteriorly threaded pin mounted on the brake casing, a link provided with internally threaded sleeve-like terminals the link and its sleeve-like terminals being slotted so that the terminals may be readily engaged over the fastening pins and the link arranged substantially parallel to the arm, and means associated with the slotted link for tightening the sleeve-like terminals of the link about the threaded fastening pins.

3. An arrangement as claimed in claim 1, in which both of said fastening pins are of hollow formation and slotted longitudinally from their outer ends.

4. A toggle joint springing means for vehicles including in combination a brake casing, a fastening pin adjustably mounted in an aperture on the said brake casing, an arm secured centrally of the brake casing, a spring casing at the outer end of the arm, a member removably mounted on the under side of the spring casing and having its outer end constructed in the form of a fastening pin, a longitudinally slotted link arranged substantially parallel to the arm and between the pins, a sleeve on each end of the said link for resiliently and removably engaging the adjacent pins, and means associated with the slot in the link for tightening the said sleeves about the said pins.

KARL HELMER EKSTRAND.